(12) United States Patent
Reisbich

(10) Patent No.: US 8,515,876 B2
(45) Date of Patent: Aug. 20, 2013

(54) DRY-RUN DESIGN TIME ENVIRONMENT

(75) Inventor: Julia Reisbich, Leimen (DE)

(73) Assignee: SAP AG, Walldorf (DE)

( * ) Notice: Subject to any disclaimer, the term of this patent is extended or adjusted under 35 U.S.C. 154(b) by 306 days.

(21) Appl. No.: 12/886,008

(22) Filed: Sep. 20, 2010

(65) Prior Publication Data

US 2012/0072367 A1    Mar. 22, 2012

(51) Int. Cl.
*G06Q 10/00*    (2012.01)
*G06F 9/44*    (2006.01)

(52) U.S. Cl.
USPC .......................................... 705/348; 717/135

(58) Field of Classification Search
USPC .................... 705/348; 717/124–135; 714/34
See application file for complete search history.

(56) References Cited

U.S. PATENT DOCUMENTS
2004/0031019 A1* 2/2004 Lamanna et al. ............. 717/125
2007/0276692 A1* 11/2007 Mei et al. ........................ 705/1

OTHER PUBLICATIONS

Yi Xie, Inegrating UML and GPSS for business process modeling and simulation, 2008, World Scientific and Engineering Academy and Society, pp. 1-6.*
Pettit, R.G. et al.; "Validation of Dynamic Behavior in UML Using Colored Petri Nets"; Internet Citation; Apr. 11, 2003; Retrieved from the internet <http://web.archive.org/web/20030411064627/http://www.disi.unige.it/person/ReggioG/UMLWORKSHOP/Pettit.pdt>.
Extended European Search Report issued in European Application No. 11006240.3 on Oct. 27, 2011; 6 pages.

* cited by examiner

*Primary Examiner* — Candice D Wilson
*Assistant Examiner* — Ehrin Pratt
(74) *Attorney, Agent, or Firm* — Fish & Richardson P.C.

(57) ABSTRACT

This disclosure provides various embodiments for performing a dry-run of a business process model in a design-time environment. A start event and end event of the business process model are identified, defining a path of a flow map including a sequence of a plurality of events, including the start event, the end event, and at least one other event sequenced between the start and ends. The events in the path are stepped-through to simulate each event. An error is identified corresponding to a particular event in the path and the step-through is paused upon identifying the error. A user is then prompted for an input to at least temporarily resolve the at least one error. The stepping-through of the plurality of events is then resumed in response to a resolution input from the user. The dry run ends in response to stepping-through to the end event.

20 Claims, 14 Drawing Sheets

DRY-RUN DESIGN TIME ENVIRONMENT

TECHNICAL FIELD

This present disclosure relates to design-time software tools and operations, and, more particularly, to systems, software, and computer-implemented methods for providing a dry-run design-time tool for business process models.

BACKGROUND

In many respects, developing, programming, and coding software involves a trial-and-error process of checking code syntax, compiling and re-compiling scripts, and testing modules of the software system in a design-time environment to ensure that the code is free of bugs and prepared for commercial or runtime deployment. Tools have been developed to assist software developers in debugging, compiling, and hard-coding their programs. Design-time tools and environments can provide such tools and development tools automating traditional software development tasks and processes. One example of a design-time environment are integrated development environments, or "IDEs". IDEs can provide a suite of design-time components and tools, sometimes in a common user interface. Rather than utilizing several, distinct development tools, an IDE integrates multiple development tools into a common package to make access to and use of the tools more convenient to the user. In some instances, an IDE is dedicated to a particular programming language, thereby providing tools and a feature set compatible with and adapted to the nuances and programming paradigms of the language. However, some multiple-language IDEs do exist, such as commercially available versions of Eclipse, ActiveState Komodo, NetBeans, Microsoft Visual Studio, WinDev, and Xcode.

IDEs can provide tools and features for authoring, modifying, compiling, deploying and debugging software. Through a tight integration of development tools and tasks, software development productivity and efficiency can be improved. A typical IDE includes a debugger, compiler, source code editor, and build automation tools. Other contemporary IDEs can further include a class browser, object inspectors, and class hierarchy tools, for example, to assist in the development of object-oriented software.

SUMMARY

This disclosure provides various embodiments for performing a dry-run of a business process model in a design-time environment. A start event and at least one end event of the business process model are identified. The start event and at least one end event define at least one path of a flow map of the business process model, the path including a sequence of a plurality of events, the plurality of events including the start event, the at least one end event, and at least one other event, the at least one other event positioned between the start event and the end event in the sequence. The plurality of events in the path are stepped-through to simulate each event in the plurality of events. At least one error is identified corresponding to a particular event in the path. The stepping-through the plurality of events is paused at the particular event in response to identifying the error. A user is then prompted for an input to at least temporarily resolve the at least one error. The stepping-through of the plurality of events is then resumed in response to a resolution input from the user until the stepping-through reaches the at least one end event, ending the dry run.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
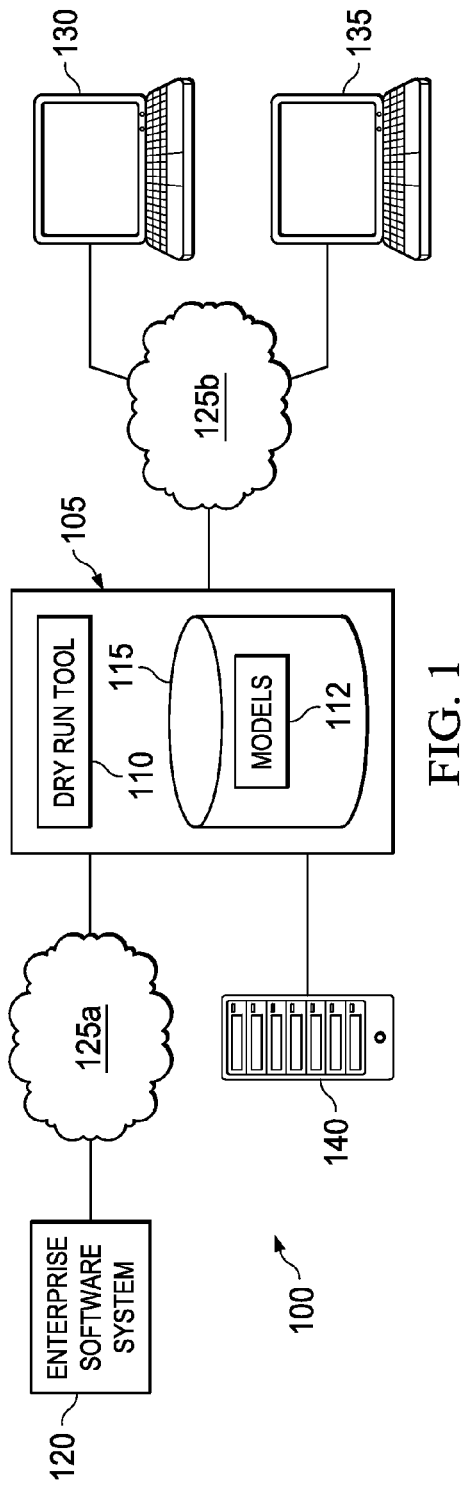
FIG. 1 illustrates an example computing system including a development environment including a dry-run simulation tool.

This disclosure generally describes software, computer-implemented methods, and systems relating to a design-time tool for conducting a dry-run of a software model, such as a business process model. A "dry-run" typically refers to a mental assessment or check of a software model, made by a software developer, prior to introducing the software model and/or related code to a computer-implemented compiler, debugger, sandbox, runtime environment, build automation tool, or other tool for more formal testing and debugging. In some instances, a software model can be used by a developer to map-out context, control and data flows prior to coding the programs, modules, and processes modeled by the software model. A software developer can develop and fine-tune the software model prior to making the investments in time, money, and computing resources needed to code the programs, modules, and processes modeled by the software model.

Generally, debuggers, compilers, and other traditional design-time tools can require a piece of code or a software model that is capable of being compiled, complete, sufficiently specified, or syntactically correct or otherwise sufficiently specified in order for the tool to complete processing. That is, when a process model, for example, is incomplete, underspecified, or syntactically incorrect, the tool cannot successfully complete testing of the model. Additionally, even in instances where a business process model is fully specified, testing its functional behavior can require a full design time-runtime roundtrip, resulting in unacceptably long turnaround times and other inconveniences adversely impacting testing and development of the software.

As described below, in some instances, a dry run simulation tool can perform computer-implemented dry-runs of an incomplete, underspecified, or syntactically incorrect business process during the modeling stage to assist a developer in assessing whether the current, partially-developed state of the process complies with the developer's expectations. During the dry run an end user can simulate the data flow, understand how simulated input and output data can affect a process execution, and recognize missing data flow definition or other issues in already defined mapping instructions. When the dry run encounters a portion of the model that is underspecified or otherwise incomplete, the dry run can temporarily pause to receive inputs from the end user, such as input data, control flow gateway conditions, and message correlation predicates corresponding to the underdeveloped portions of the model, to temporarily bridge the portion and allow the user to complete a preliminary test or run of the model.

Business process execution can not only depend on control flow aspects but also data flow. For instance, data flow instructions can be specified in connection with mappings of process activities and events (e.g., transformations from the global data context to the activity signature and vice-versa). Additionally, data flow can also affect expressions relating to the process data context of the model, such as conditional gateways or message correlation predicates. For instance, in the event that a gateway condition or message correlation predicate is not correctly defined, a business process can fail to execute properly at runtime, if at all. In such an instance, a dry-run of modeled process can assist a developer in understanding if any and/or all conditions, correlations, and data flow of a business process are correctly defined in advance of further development efforts and process deployment on a "live," productive system.

FIG. 1 illustrates an example computing system 100 including a development environment 105 that includes a dry-run simulation tool 110. The development environment 105 can be an integrated development environment or IDE and include an integrated set of other development tools in addition to the dry-run simulator tool 110. The development environment 105 can include one or more business process models 112 stored in memory 115 that are accessible to the development environment 105, including the design time dry-run simulation tool 110. As an example, business process models 112 can be accessed from memory associated with a workspace of development environment 105. The development environment can be implemented in connection with an enterprise software system 120 providing business services to one or more customers 130, 135, such as shown in the example of FIG. 1, over one or more networks 125. The development environment 105 itself can be provided as a service to one or more remote client computing devices (e.g. 130, 135). In some instances, at least a portion of the development environment 105, including the dry-run simulation tool 110, can be installed on the client devices 130, 135 themselves, and interact with a backend portion of the development environment 105 remote from the client devices 130, 135. In still other examples, the development environment 105 can be provided as a distributed software environment, such as a cloud computing system. In still other instances, the development environment 105 can be locally stored and executed on end-user computing devices 130, 135. Business process models developed and tested using the development environment 105 can be exported to or imported from other computing devices, including a client computing device (e.g., 130, 135), an enterprise software system 120, or other application server 140 or computing device, including computing devices remote from the development environment 105.

The development environment 105 can be implemented using one or more computing devices. As used in this document, the term "computing device" or "computer" is intended to encompass any suitable processing device. For example, a computing device can include one or more servers operable to receive, transmit, process, store, or manage data and information associated with the software environment 100. For example, the environment 100 may be implemented using computers other than servers, including a server pool. Further, any, all, or some of the servers (including computing devices 120, 130, 135, 140) may be adapted to execute any operating system, including Linux, UNIX, Windows Server, or any other suitable operating system. Clients 130, 135, as well as other users external to environment 100, can, directly or indirectly (e.g., via a proxy, virtual machine interface, etc.) access and perform operations, testing, and dry runs using the development environment 105. It will be further understood that the term "application server" (e.g., 140) can include any suitable software component or module, or computing device(s) capable of hosting and/or serving a software application, including distributed, enterprise, or cloud-based software applications.

In the present example, the development environment 105 can interface with one or more application servers 140 and/or enterprise software systems 120. In some instances a development environment 105 can be hosted on a common computing system, server, or server pool, and share computing resources, including shared memory, processors, and interfaces with an enterprise software system or other software system. The development environment 105 can interface with other software systems and client devices to communicate in a client-server or other distributed environment (including within environment 100). Computing devices providing the development environment 105 can include one or more interfaces comprising logic encoded in software and/or hardware in a suitable combination and operable to communicate with a network 125, and other computing devices, including computing devices coupled to the network 125. More specifically, such interfaces can comprise software supporting one or more communication protocols associated with communications such that a network 125 or hardware is operable to communicate physical signals within and outside of the illustrated software environment 100.

Each of the example servers (e.g., 120, 140), including servers and computing devices hosting the development environment 105, can include a processor. Each processor can execute instructions and manipulate data to perform the operations of the associated server, and may comprise, for example, a central processing unit (CPU), a blade, an application specific integrated circuit (ASIC), or a field-programmable gate array (FPGA), among other suitable options. Processors can be implemented as one or more processors according to the particular needs of the associated server. References to a single processor can also be interpreted to include multiple processors where applicable. The operations that each processor executes can be determined by the purpose and operations of its associated server. Generally, the processor executes instructions and manipulates data to perform the operations of its respective server and, specifically, the software systems and applications (e.g., 105) hosted by the server.

At a high level, each "server" includes one or more electronic computing devices operable to receive, transmit, process, store, or manage data and information associated with the environment 100. Specifically, a server is responsible for receiving requests from one or more clients and sending the appropriate response the requesting client. In addition to requests from external clients, requests may also be sent from internal users, external or third-party customers, other automated applications, as well as any other appropriate entities, individuals, systems, or computers. For example, although FIG. 1 illustrates single server for application server 140, and a server pool for enterprise system 120, a server can be implemented using one or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, a server can be adapted to execute any operating system, including Linux, UNIX, Windows, Mac OS, or any other suitable operating system.

In the case of an server implementing development environment 105, the server processor can execute the functionality required to receive and respond to requests and interactions from client devices 130, 135, as well as client applications 140 interfacing with the development environment 105. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, applications included in the environment 100 can include any application, program, module, process, or other software that may execute, change, delete, generate, or otherwise manage information according to the present disclosure, particularly in response to and in connection with one or more requests received from the illustrated clients 130, 135, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications, including applications provided through enterprise software services 120 may represent web-based applications accessed and executed by remote clients 130, 135 or client applications 140 via the network 125 (e.g., through the Internet). Further, one or more processes associated with a particular hosted application may be stored, referenced, or executed remotely. For example, a portion of a particular hosted application may be a web service associated with the application that is remotely called, while another portion of the hosted application may be an interface object or agent bundled for processing at a remote client 130, 135. Moreover, any or all of the hosted applications may be a child or sub-module of another software module or enterprise application (not illustrated) without departing from the scope of this disclosure. Still further, portions of the hosted application may be executed by a user working directly at server 140, for example, as well as remotely at a client 130, 135.

Each of the example servers 105, 120, 140 can includes a memory. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory will be described in detail below in connection with the illustrated implementations of the software environment 100 and components thereof.

Generally, the network 125 facilitates wireless or wireline communications between the components of the software environment 100 (e.g., between the development environment 105 and one or more client devices 130, 135 utilizing the development environment 105), as well as with any other local or remote computer, such as those associated with the one or more applications 120, 140 or external data sources. The network 125 can be implemented as one or more distinct networks. In any implementation, the network 125 may be a continuous or discontinuous network without departing from the scope of this disclosure, so long as at least a portion of the network 125 may facilitate communications between senders and recipients. The network 125 may be all or a portion of an enterprise or secured network. As an example, in FIG. 1 networks 125*a* may represent a portion of an enterprise network, while network 125*b* may represent a connection to the Internet. In some instances, a portion of the network 125 may be a virtual private network (VPN). All or a portion of the network 125 can comprise either a wireline or wireless link. Example wireless links may include 802.11a/b/g/n, 802.20, WiMax, and/or any other appropriate wireless link. In other words, the network 125 encompasses any internal or external network, networks, sub-network, or combination thereof operable to facilitate communications between various computing components inside and outside the illustrated environment 100. The network 125 may communicate, for example, Internet Protocol (IP) packets, Frame Relay frames, Asynchronous Transfer Mode (ATM) cells, voice, video, data, and other suitable information between network addresses. The network 125 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 130, 135. The client 130, 135 is any computing device operable to connect or communicate at least with the development environment 105 and/or the network 125 using a wireline or wireless connection. Each client 130, 135 can include a graphical user interface (GUI). In general, the client 130, 135 comprises an electronic computing device operable to receive, transmit, process, and store any appropriate data associated with the software environment of FIG. 1. It will be understood that there may be any number of clients 130, 135 associated with environment 100, as well as any number of clients 130, 135 external to environment 100. Further, the term "client" and "user" may be used interchangeably as appropriate without departing from the scope of this disclosure. Moreover, while each client 130, 135 is described in terms of being used by one user, this disclosure contemplates that many users may use one computer or that one user may use multiple computers. As used in this disclosure, the client 130, 135 is intended to encompass a personal computer, touch screen terminal, workstation, network computer, kiosk, wireless data port, smart phone, personal data assistant (PDA), one or more processors within these or other devices, or any other suitable processing device. For example, the client 130, 135 may comprise a computer that includes an input device, such as a keypad, touch screen, mouse, or other device that can accept information, and an output device that conveys information associated with operations of the development environment 105 (including the dry-run simulation tool 110), as well as other applications stored and/or executed on the enterprise software system 120, application server 140 (or other servers in environment 100), or on the client 130, 135 itself, including digital data, visual information, or the GUI. Both the input device and the output device may include fixed or removable storage media such as a magnetic computer disk, CD-ROM, or other suitable media to both receive input from and provide output to users of the clients 130, 135 through the display, namely the GUI.

A GUI can comprise a graphical user interface operable to allow the user to interface with at least a portion of environment 100 for any suitable purpose, including allowing a user to interact with one or more software applications, including the development environment 105. Generally, a GUI provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI can be any graphical user interface, such as a web browser, touch screen, or command line interface (CLI) that processes information in the environment 100 and efficiently presents the results to the user. In general, the GUI may include a plurality of user interface (UI) elements such as interactive fields, pull-down lists, media players, tables, graphics, virtual machine interfaces, buttons, etc. operable by the user at the client 130, 135. These UI elements may be particularly related to and adapted for the functions of the development environment 105, including the dry-run simulation tool 110.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
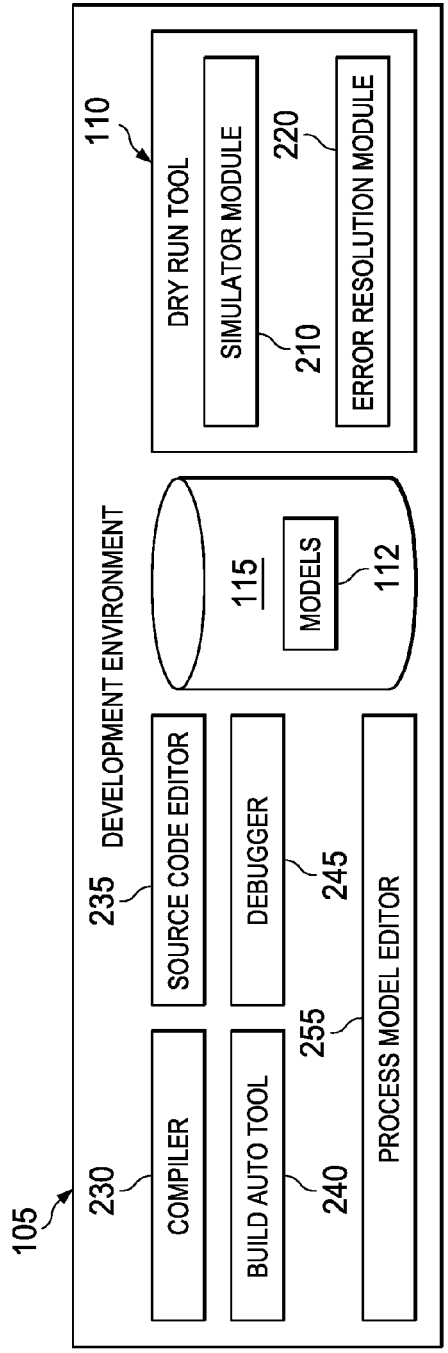
FIG. 2 is a schematic illustration of an example implementation of a dry-run simulation tool.

FIG. 2 is a schematic representation of one example implementation of a dry-run simulation tool 110 of a development environment. In some implementations, the dry-run simulation tool 110 can include a simulator module 210 and an error resolution module 220. One or more business process models 112 can be stored in a memory 115 accessible to or associated with the dry-run simulation tool 110. The simulator module 210 can be adapted to perform a step-through simulation of each event in a path of a process model. The simulator module 210 can include functionality that allows a user to simulate various inputs or control conditions at the event to test how the event, and subsequent events in the path, respond to the simulated inputs. One or more GUIs, including pop-windows, can be displayed in connection with the functionality of the simulator module 210, allowing users to analyze and interact with parameters of each event on an event-by-event basis. In addition to allowing a user to test and scrutinize each event in a process model, the simulator module 210 can additionally identify errors associated with the events. For instance, an error can identify parameters of an event that are un- or under-specified.

The error resolution module 220 can operation in connection with the simulator module 210 to prompt a user for a resolution input to temporarily resolve errors identified by the simulator module 210. A dry-run simulation instance can be paused by the dry-run simulation tool 110 in response to a simulator module's 210 detection of an event error. The dry-run can be paused at the corresponding event until an acceptable resolution input is received by the error resolution module 220. The error resolution module 220 can additionally identify the nature of the error and identify a set of potential resolution inputs or input options that could satisfy the error prompt. For instance, the error resolution module 220 can present, through the prompt, a brief description of the error and suggest one or more resolutions to the particular error. For instance, the prompt can present multiple resolution options selectable by the user, and identified by the error resolution module 220 as acceptable responses to the error.

As shown in FIG. 2, the dry-run simulation tool 110 can be integrated with a development environment 105 that includes additional development tools including a compiler 230, source code editor 235, a build automation tool 240, a debugger 245, and a process model editor 255. The process model editor 255 can provide functionality for building and editing a business process model. One or more of the development tools included in the development environment, including the process model editor 255, can interface with the dry-run simulator module 210 to extend the functionality of the dry-run simulation tool 110. For instance, the process model editor 255 can provide a graphical editing environment allowing users to edit, add, and delete events in a process model. The editing functionality of the process model editor 255 can be used to modify a process model concurrently with a dry-run simulation of the same process model. For instance, in response to a pause in the dry-run simulation associated with an error identified by the simulation module 210, a user can respond to an error prompt generated by the error resolution module 220 by editing aspects of the process model, temporarily or permanently, using editing functionality provided through the process model editor 255. The error resolution module 220 can identify that modifications made to a process model during a dry-run simulation using the process model editor 255, resolve an identified error sufficiently to allow the dry-run step-through to proceed to another event in a path of the simulated process model.

The example described and illustrated in connection with FIG. 2 is but one example implementation of a dry-run simulation tool for use and inclusion in a design-time development environment. Alternate implementation can be realized that provide substantially similar functionality and results. For example, in some instances, the functionality of modules 210, 220 can be combined, wholly or partially, in a single module. In other instances, the functionality of modules 210, 220, as well as other functionality present in the dry-run simulator can be provided through other additional modules.

Figure 3A:
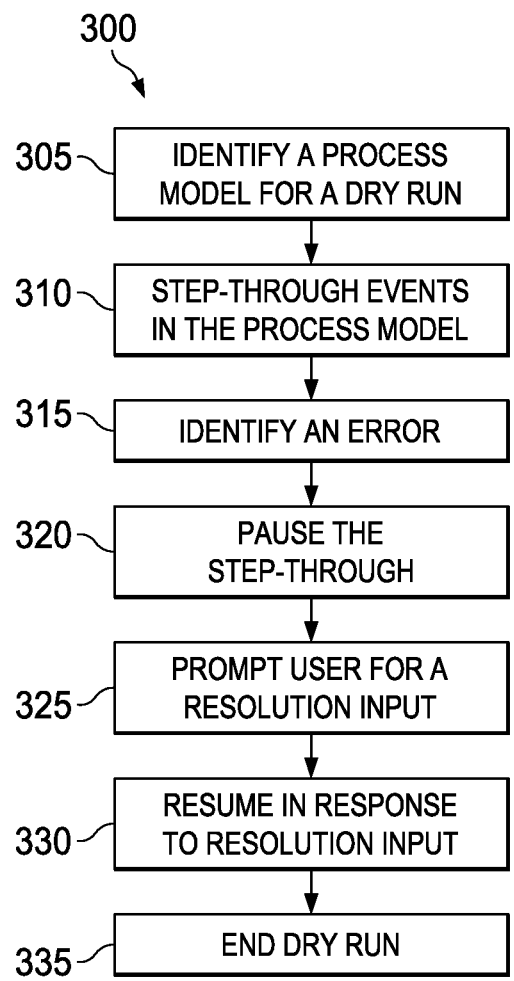
FIG. 3A is a flowchart illustrating an example computer process for performing a dry-run of a business process model in a design-time environment.

FIG. 3A is a flowchart 300 illustrating an example computer process for performing a dry-run of a business process model in a design-time environment, such as development environment 105. At least one path of a flow map of a particular business process model can be identified 305. The path can define a sequence of a plurality of events in the business process beginning with a start event, ending with at least one end event, with at least one other event positioned between the start event and the end event in the sequence. The dry-run can step-through 310 the plurality of events in the path to simulate each event in the plurality of events. At least one error can be identified 315 corresponding to a particular event in the path. Stepping-through the plurality of events can be paused 320 at the particular event in response to identifying the at least one error. A user can be prompted 325 for an input to at least temporarily resolve the at least one error. For instance, a pop-up window can be presented to the user to offer suggestions or options for a temporary remedy (such as a missing input value) and receive inputs from the user specifying a temporary remedy. Stepping-through of the plurality of events can be resumed 330 in response to receiving a resolution input from the user. The dry run can end 335 in response to stepping-through to the at least one end event.

Figure 3B:
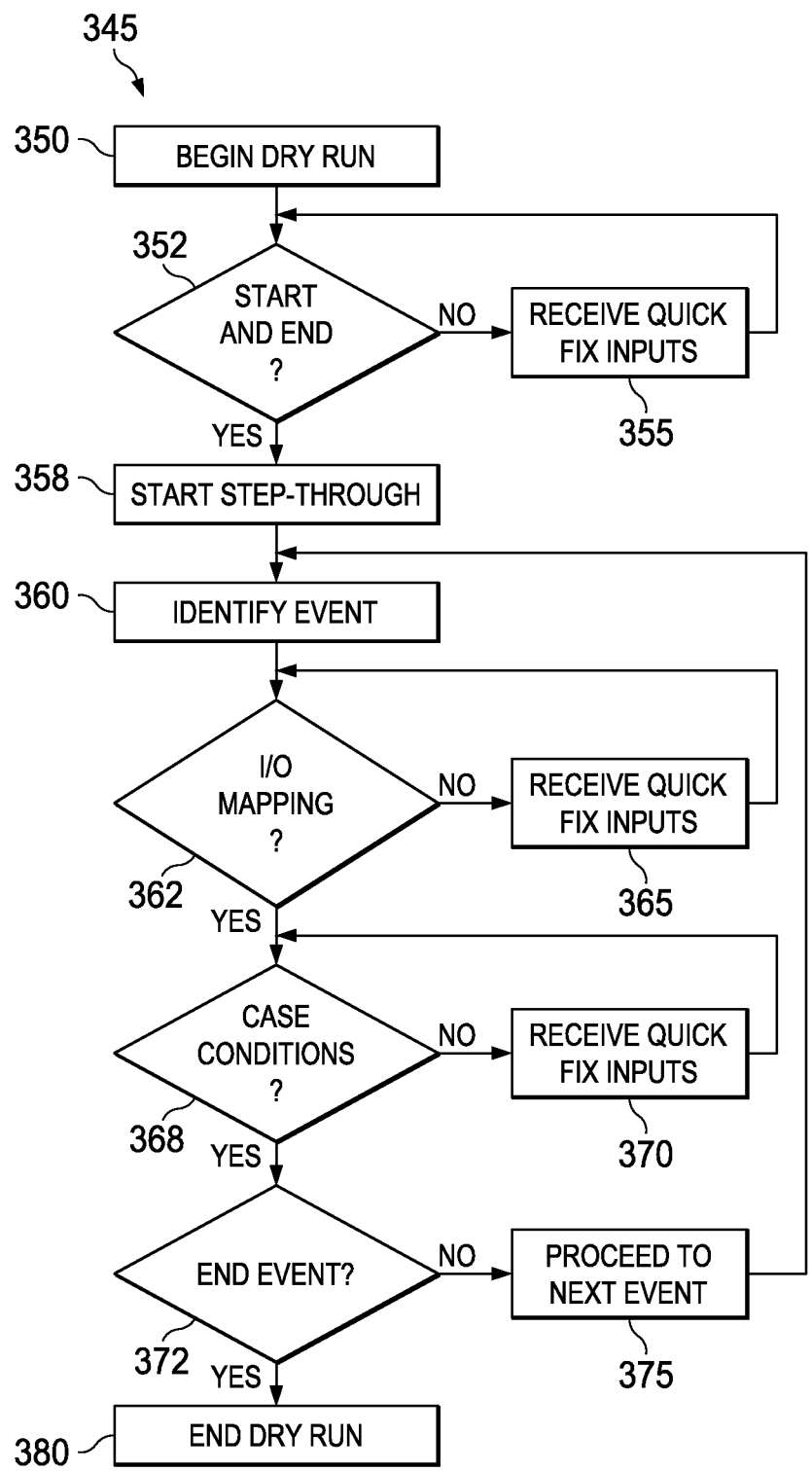
FIG. 3B is a flowchart illustrating another example of a computer process for performing a dry-run of a business process model in a design-time environment.

FIG. 3B is a flowchart 345 illustrating another example of a computer process for performing a dry-run of a business process model in a design-time environment. A dry run can be initiated 350, for instance, by a user using a integrated development environment that includes a dry-run simulation tool. A particular business process model can be identified and debugged using the dry-run simulation tool. The dry run can begin by checking 352 to make sure that a start event and at least one end event have been properly specified for a path of the model. If one or both of the start and end events have not been specified, or incorrectly or improperly specified, a user can be prompted accordingly and "quick fix" inputs received 355 corresponding to the user's selection or identification of specifications or remedies for the missing start and/or end event.

If the start event and at least one end event have been properly specified, the dry run can identify a path of the model, with one or more branches, that include a plurality of events. With the path identified, the dry run can step-through 358 each of the events in the plurality of events to simulate each data flow and/or control flow corresponding to each of the modeled process events. An event is identified 360 and simulation (and, if necessary, debugging) of the event is initiated. The event can be checked 362 to see if input or output data needed for the event are properly specified. If it is determined that input/output mapping of the event have been under- or improperly-specified, the user can be prompted to define or provide 365 test values or specifications for the input/output mapping. In addition, control and case conditions of the event can be checked 368 to ensure that control logic for the event has been properly specified. Checking case conditions 368 can take place in parallel or serially with checking the input/output mapping 362. While FIG. 3B shows checking control conditions 368 to take place after input/output mapping has been verified 362, check 368, in some implementations, can be performed prior to check 362, and input/output mapping check 362 can be completed in response to verifying control conditions 368. In some instances, the order of checks 362, 368 can be arbitrary or performed substantially concurrently.

As with checks 352, 362, in response to determining 368 that control conditions have been inadequately specified, the dry-run can be paused, to allow the user to submit 370 quick-fix inputs to temporarily remedy the error and allow the dry-run simulation to resume and proceed to an end event 372. Quick-fix inputs 370 received in response to a control condition check 368 can specify logic or conditions that should be applied in the simulation to designate how data flows from one event to another. The specified logic and/or conditions of an event can use or reference the I/O mapping, as well as variable values, to determine the process flow from one event to the next. For instance, the logic can specify two or more cases conditions, such as IF x THAN a; IF y THEN b, etc. In some instances, quick-fix inputs 370 received in response to a control condition check 368 can be as simple as an explicit designation of the event, path, or branch that should be followed in the model. For instance, if a first event calls for control to flow to one of either two subsequent events in response to the first event, the user can specify a quick-fix that includes a designation of one of the two subsequent events to which control is to be passed. Upon concluding simulation of an event, if the event is an end event 372, the dry run ends 380. However, if the event is not an end event, the step-through proceeds 375 to the next event simulated in the model. Proceeding 375 to the next event in the model can be dependent on the simulated outcomes or output of another event previously simulated in the dry-run. For instance, as articulated in the previous example, a quick-fix for a previous event can result in the user hard-driving the process flow to a particular subsequent event in the model. Accordingly, in this example, the dry-run step-through can proceed 375 to the particular event specified in the quick-fix input 370. Stepping-through to subsequent events can involve cycling the debugging steps 362-372 for each event until an end event is reached 372, ending 380 the dry run.

Figure 4A:
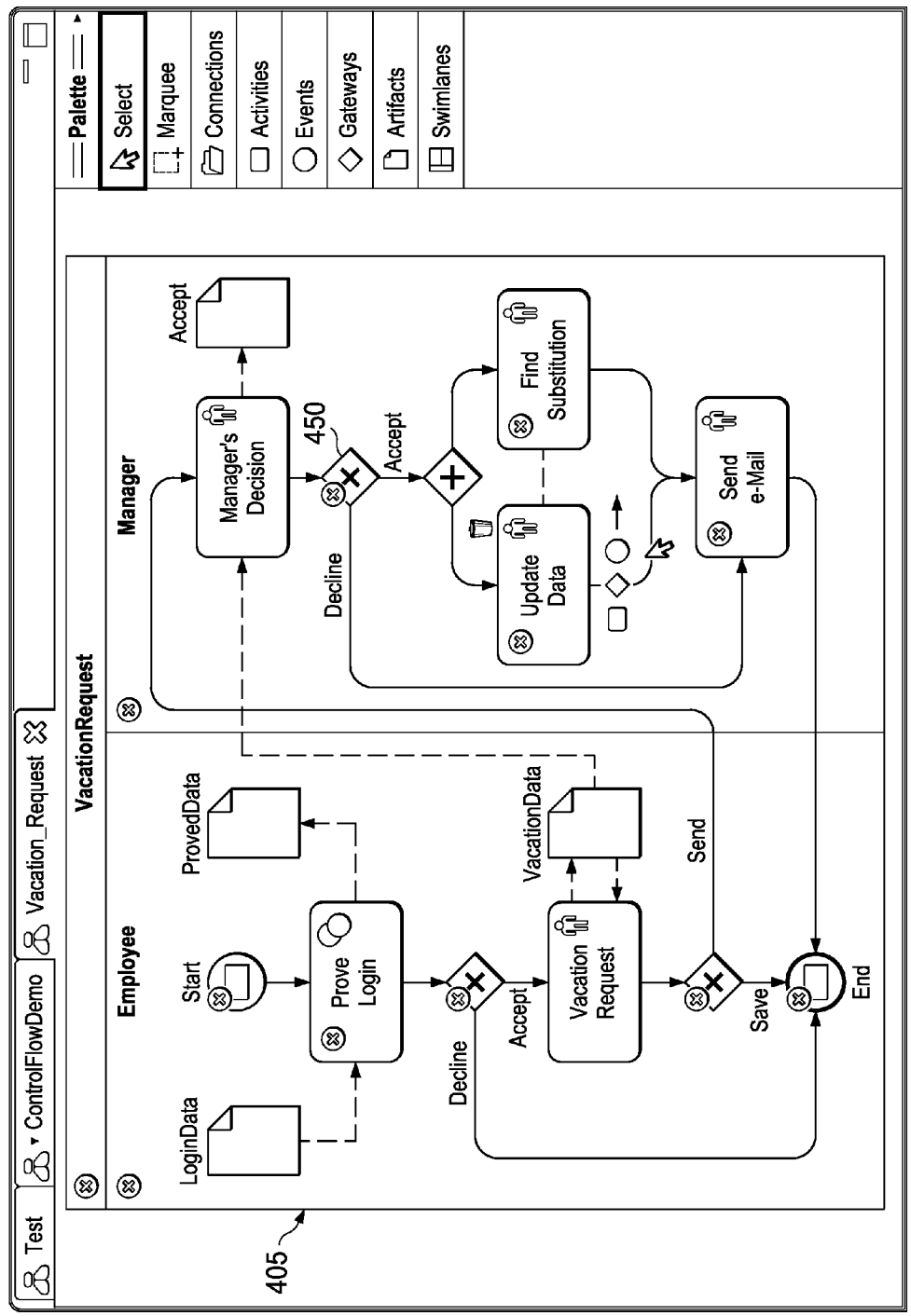
FIGS. 4A-4F illustrate example screenshots of a user interface of a design-time environment including a dry-run simulation tool.

FIGS. 4A-4F illustrate example screenshots of a user interface 400 of a design-time environment including a dry-run simulation tool implementing techniques and incorporating features similar to some of those described in connection with FIGS. 1-3B. As an illustrative example, and as shown in FIG. 4A, a business process model 405 can be selected for development and debugging in an integrated development environment. In this example, business process model 405 models a vacation request business process that, when fully developed and deployed, can allow employees to submit a vacation request to a manager and receive a response, for example, via email to the request. A visual representation of the model 405 can be presented to a user on a GUI and allow the user to visualize the general control and data flow of a modeled process. The model can include control flow elements with decision gateways, data flow objects, definitions, and other modeling entities according to the specifications of the modeling environment. In addition to other, typical features and tools of integrated development environments, the development environment in this particular example can include a dry run simulation tool.

Figure 4B:
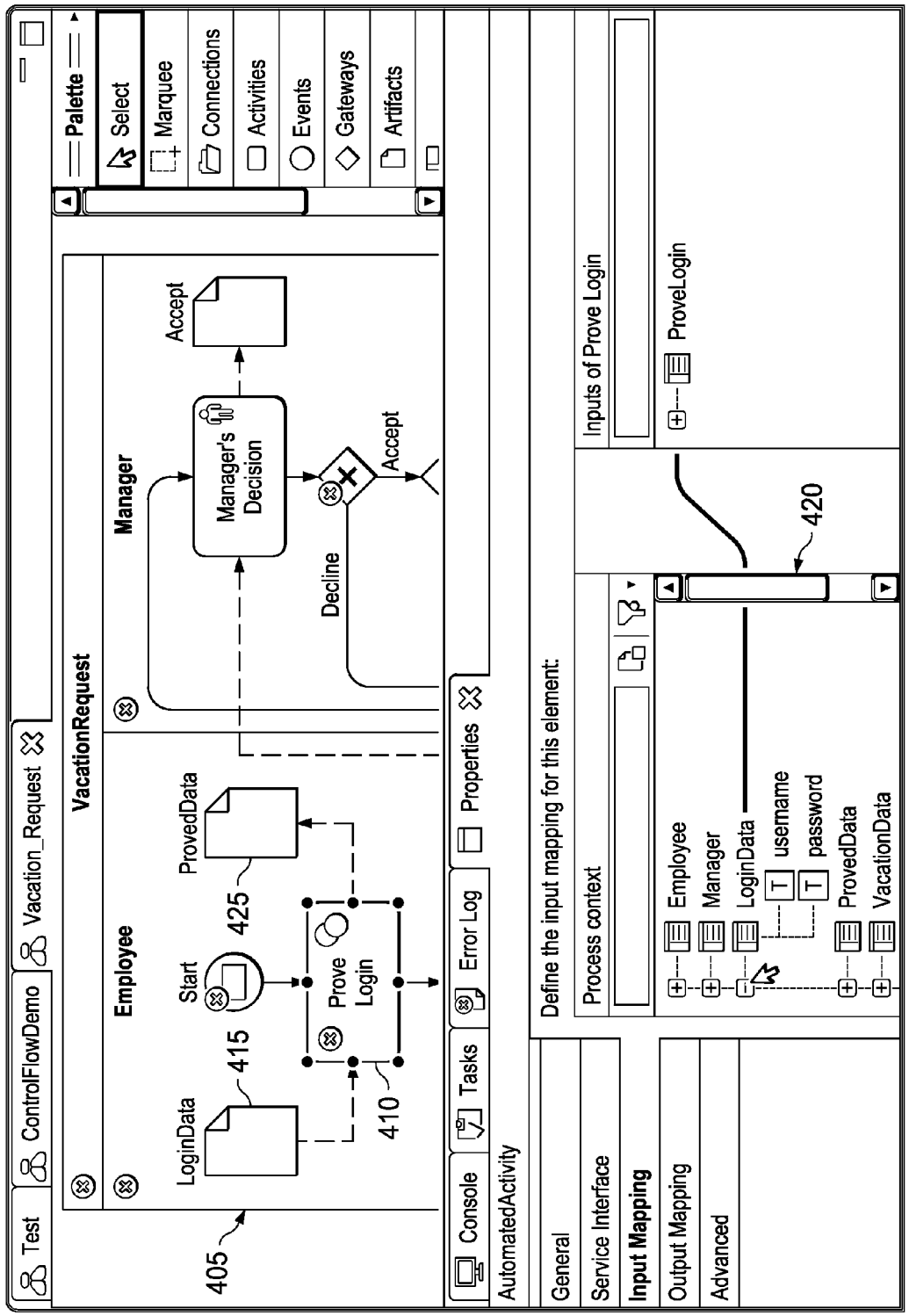
Figure 4C:
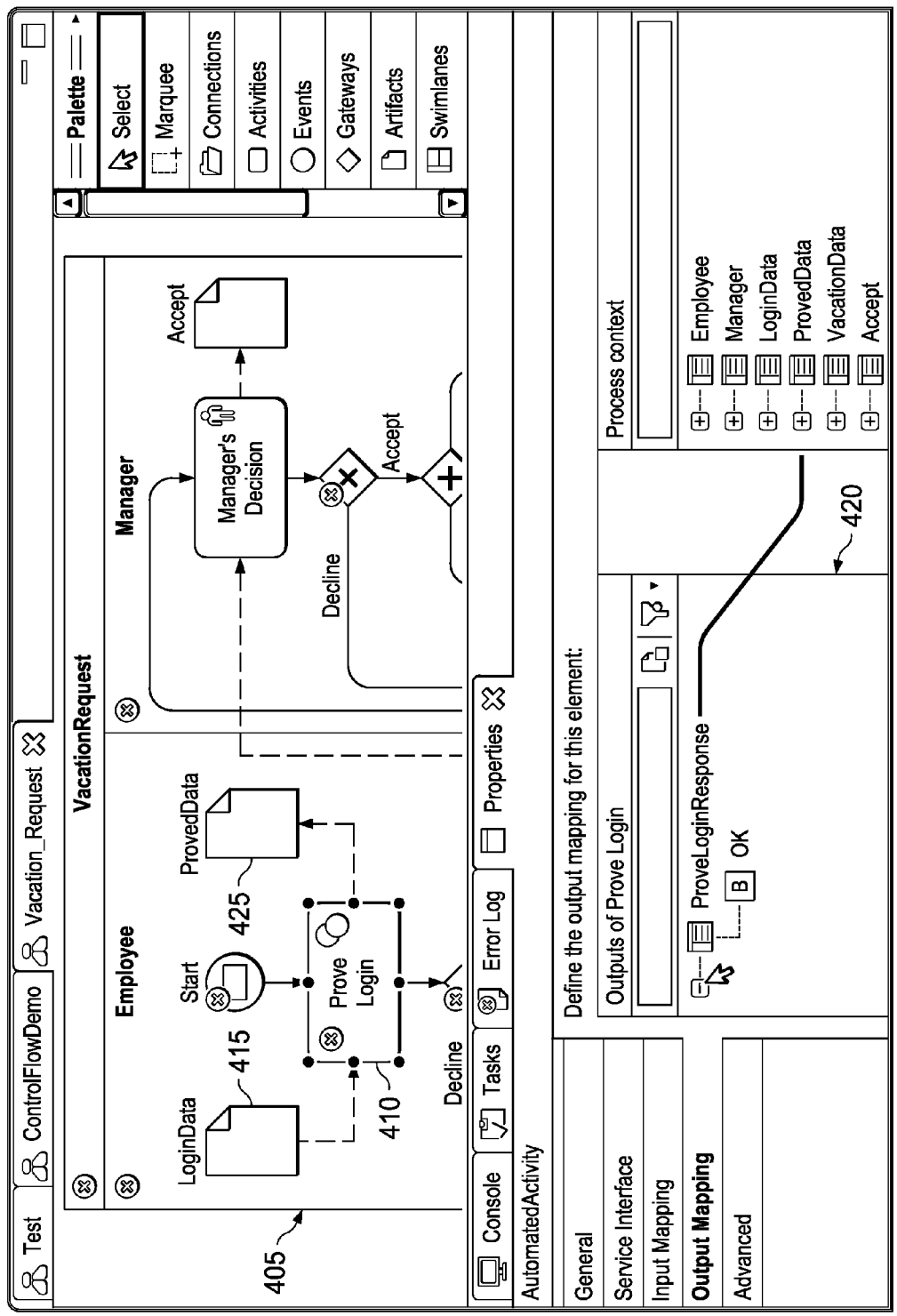

A dry-run simulation can be performed on business process model 405. The simulation can include stepping-through and simulating events in the model according to a sequence or logic defined by the model. The dry-run simulation can also identify errors or underspecified modeling elements, such as underspecified or unspecified input data, control conditions or logic, decision element conditions, etc. In the example of FIG. 4B, stepping through the process model leads to the simulation and debugging of a Prove Login event 410. A user can simulate, check, test, and modify an event during the dry-run. For instance, the Prove Login event 410 can have an input variable or object Login Data 415, corresponding to a user's log-in inputs used to authenticate a user of the modeled vacation request submission system. As shown in window 420, a user can see and review parameters associated with the Login Data object 415 as well as the input mapping associated with the object 415 (e.g., in this case, the object's association with and processing by the Prove Login process event 410). In this example, the Prove Login process event 410 can also have a ProvedData output data object 425 associated with the event 410 (e.g., corresponding to data communicating the results of a user's successful or unsuccessful authentication attempt). As shown in FIG. 4C, a user can similarly view parameters and values associated with the output data object 425. Additionally, during the dry run, the user can experiment with and modify input data and data objects associated with and passed between events in the model to simulate how the process model passes, processes, or reacts to the sample variable and data values used by the user. The user can assess the results of these "trial runs" to determine whether the process model 405 accurately captures the general functionality desired for the process modeled by the process model 405.

Figure 4D:
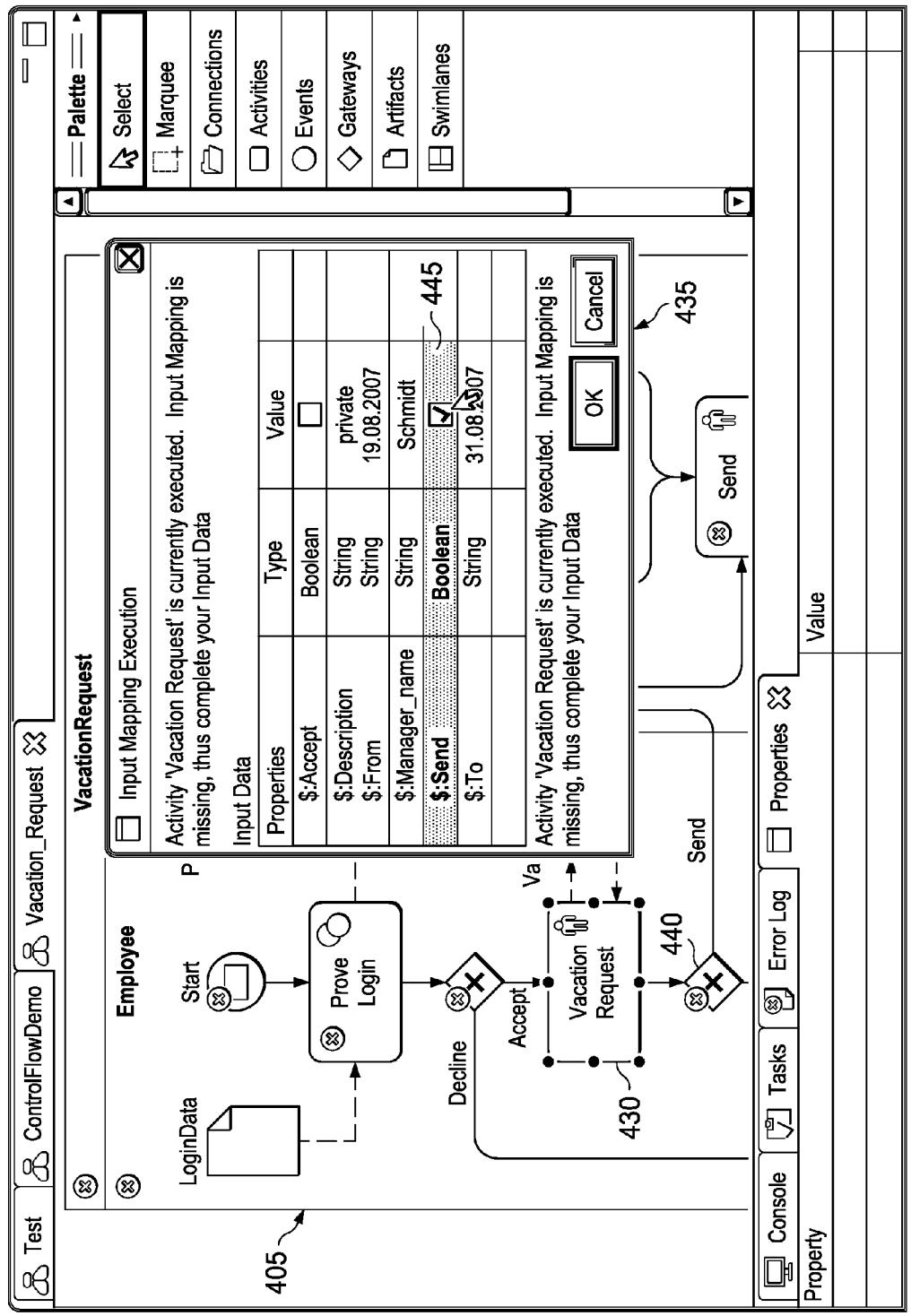

Further, as shown in FIG. 4D, as the dry run proceeds through events in a path of the model, the step-through may identify one or more errors associated with a particular event. In the example of FIG. 4D, an input mapping error has been identified by the dry run tool in connection with a Vacation Request event 430. The I/O mapping error can relate to variables or data object values that would normally be specified by a user or another process outside the scope of the model. In response to the error, a prompt 435 can be displayed to the user identifying the error and providing a GUI adapted to receive user inputs that can temporarily remedy the error to allow the dry run to proceed to completion. In this example, the prompt 435 is a pop-up window adapted to accept temporary input data needed to complete the dry run. In some instances, the prompt 435 can identify or suggest a set of potential resolution inputs to the user. In some instances, the set of potential resolutions can be closed set (i.e., the only available and responsive resolution inputs for a particular error), while in other instances the resolutions may be merely suggestive, or an open set. In some instances, resolution of errors with a variable's values or specification can be needed in order to completely simulate the particular event associated with the variable, or the error may identify that subsequent events are dependent on a missing or underspecified variable value, as is the case in the example of FIG. 4D. A subsequent decision event 440 depends on a Boolean variable value Send, in the Vacation Request event 430, indicating whether a vacation request should be sent to a manager for review. As shown in FIG. 4D, a user can enter a value 445 for the variable for purposes of completing the dry run simulation of the process model 405.

Figure 4E:
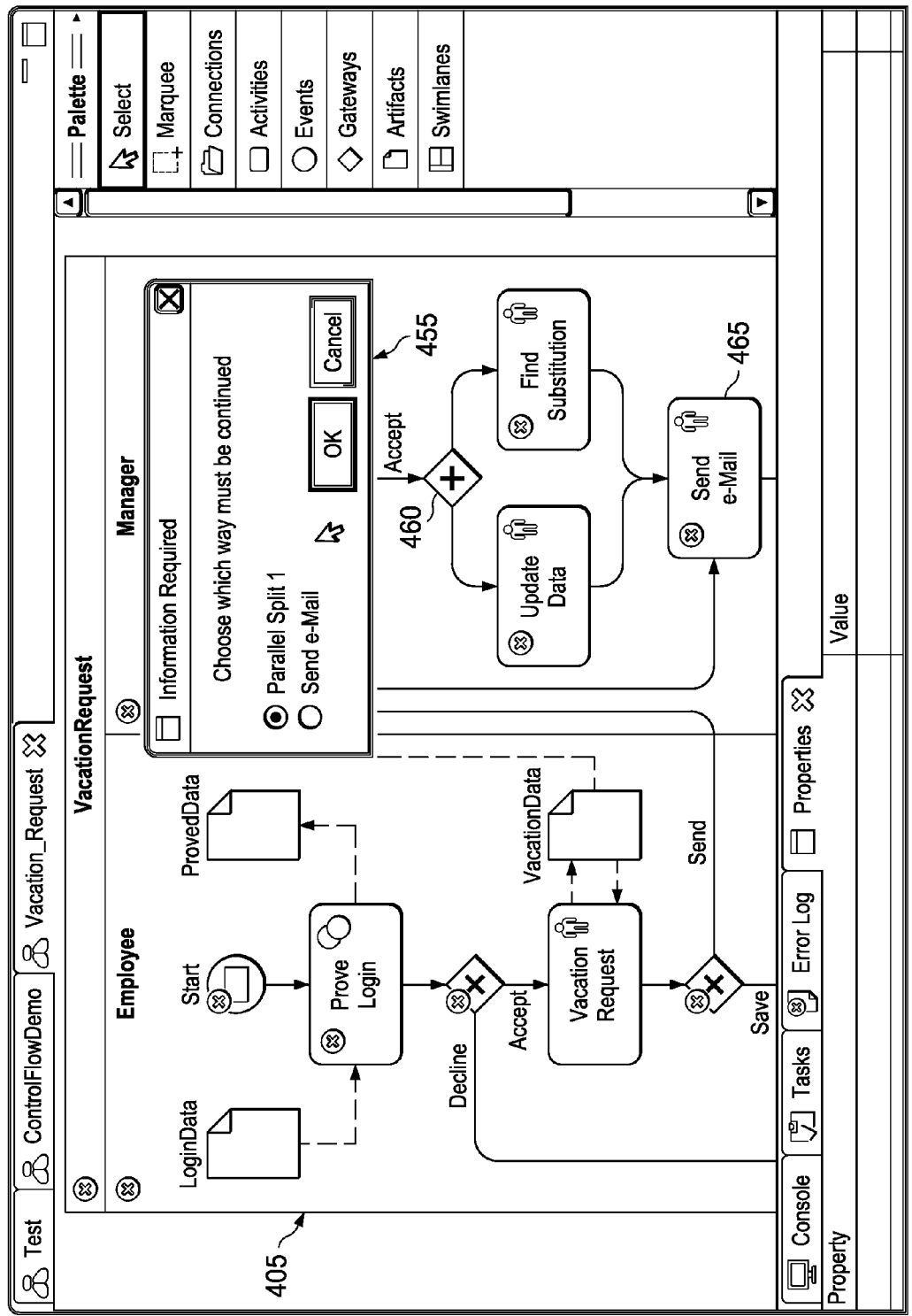
Figure 4F:
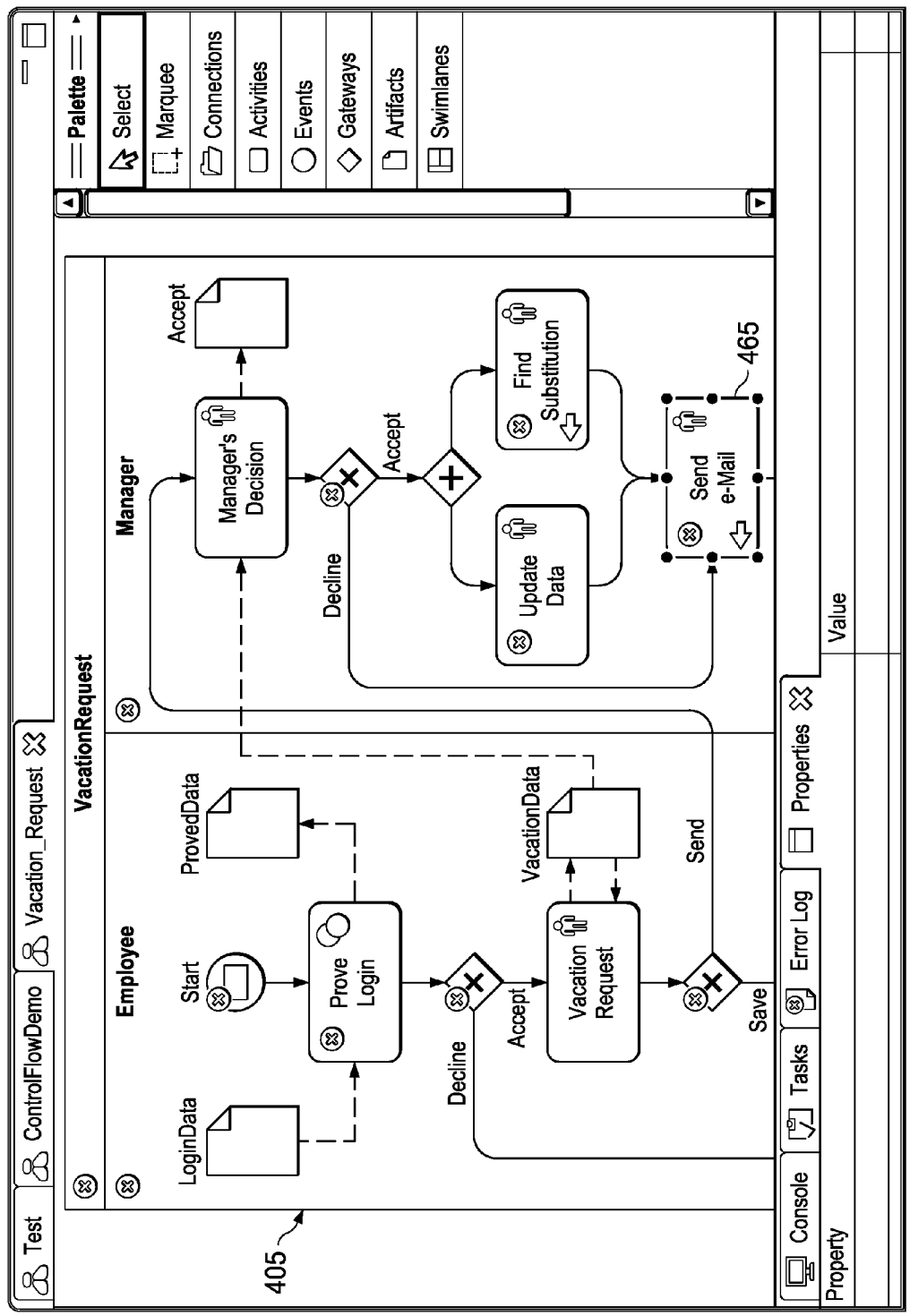

As shown in the example illustrated in FIG. 4E, errors can also relate to data flow control. For instance, decision logic or conditions of a decision event 450 (shown in FIG. 4A) included in the model, can be underspecified, resulting in the identification of an error in the dry run. A user can be presented with a prompt 455 requesting a temporary resolution to the error. For instance, in the case of a control flow error, a request for rough, makeshift, or temporary control conditions or logic can be received through the prompt GUI 455, or the result of the control event can simply be specified by the user. As with I/O mapping errors, the prompt 455 can identify and provide resolution options for a user to select that could potentially provide an acceptable temporary resolution to the error. As shown in the FIG. 4E, a user, in this example, can simply specify how data is to flow through the decision event 450, allowing the user to ignore, for the time being, the underspecified nature of the event 450 and proceed with the dry run simulation. In this example, the user has specified that the dry-run is to proceed as if the decision event resulted in the passing of control to branch split event 460, rather than the immediate passing of control to the Send Email event 465. As shown in FIG. 4F, the user can continue to step-through, test, and simulate, and event correct or modify certain events, as the user proceeds through each event in a model's path until the user reaches an end event in the path and concludes the dry run.

Figure 5A:
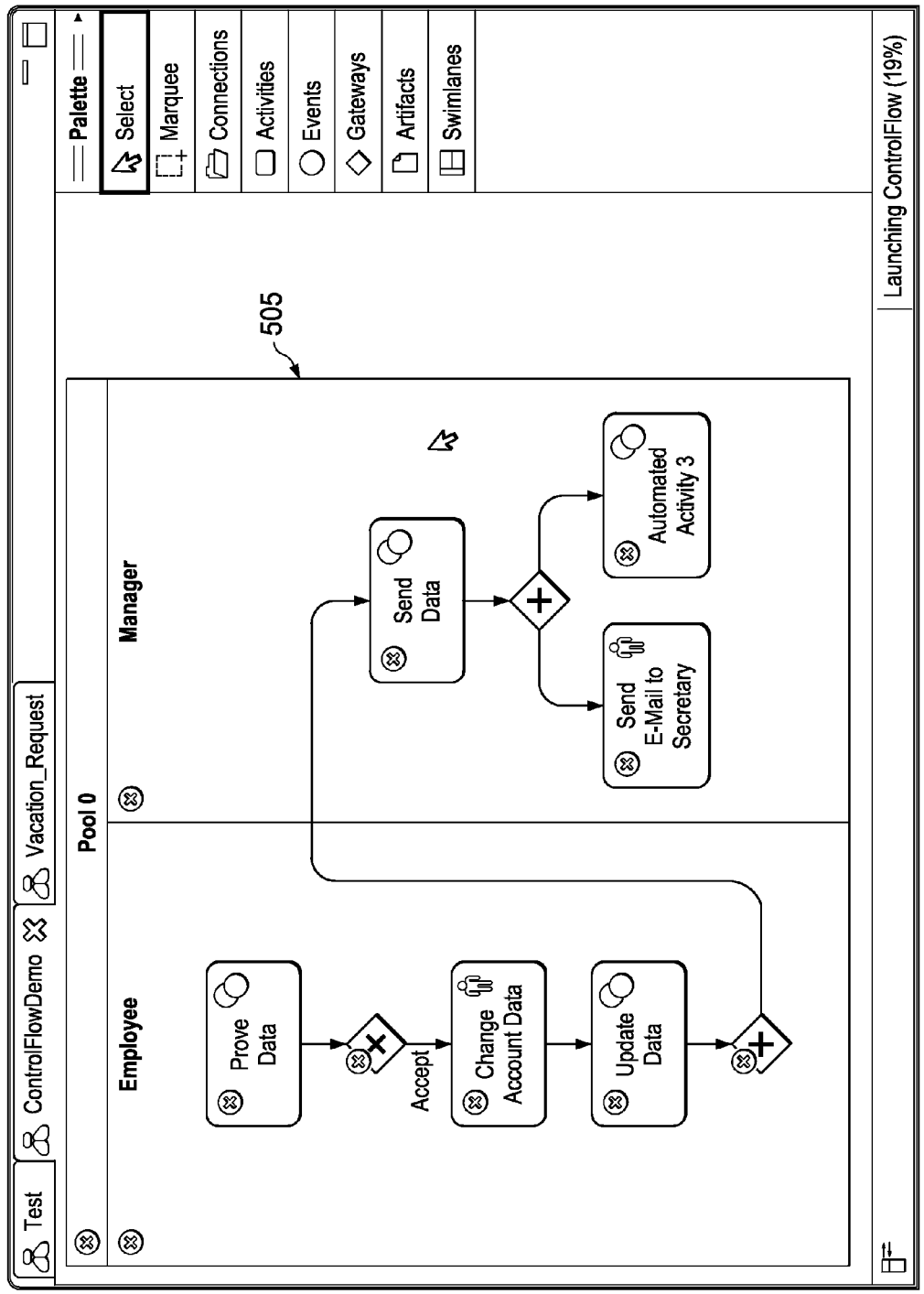
FIGS. 5A-5E illustrate example screenshots of a user interface of another example use of a dry-run simulation tool.
Figure 5B:
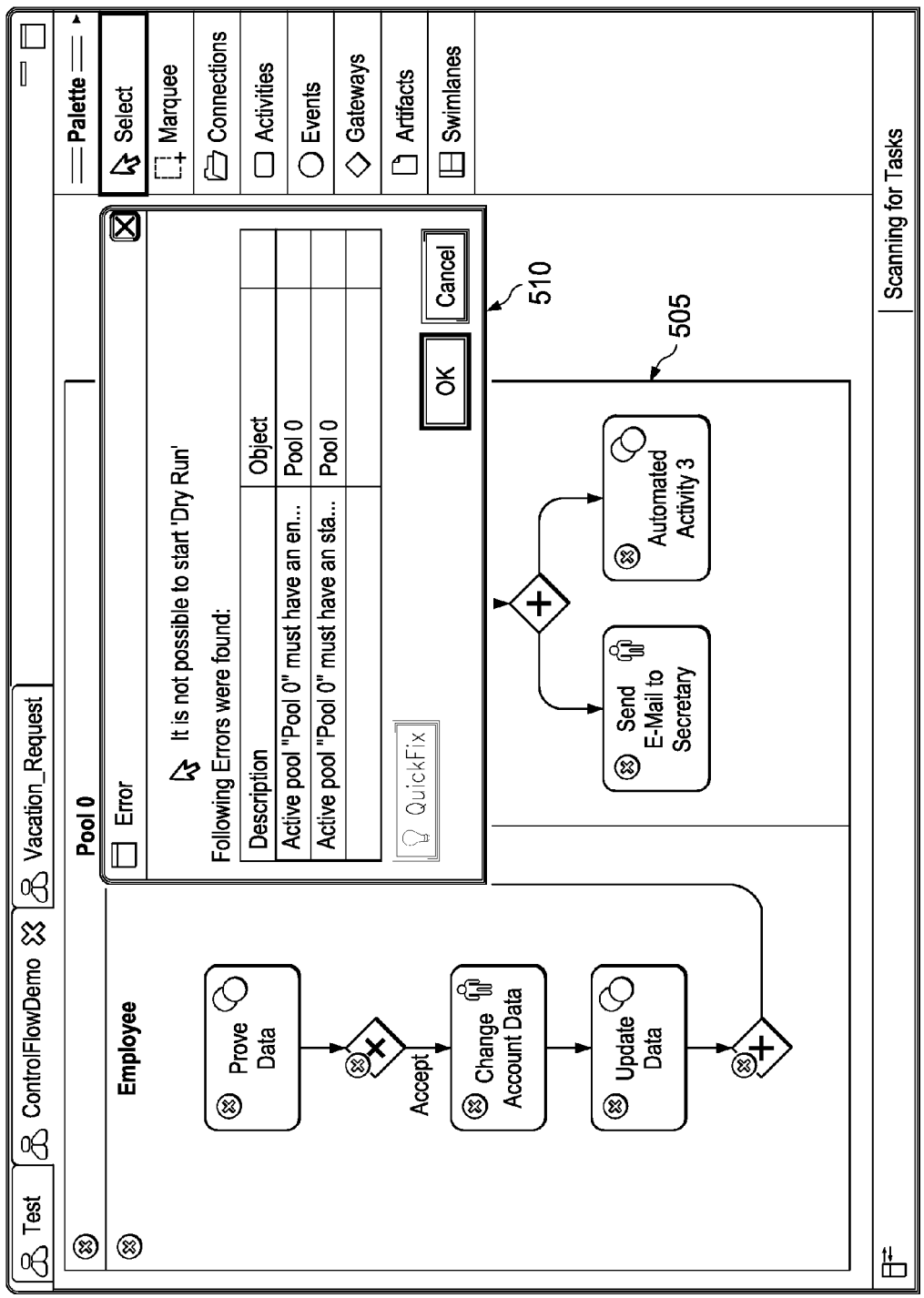
Figure 5C:
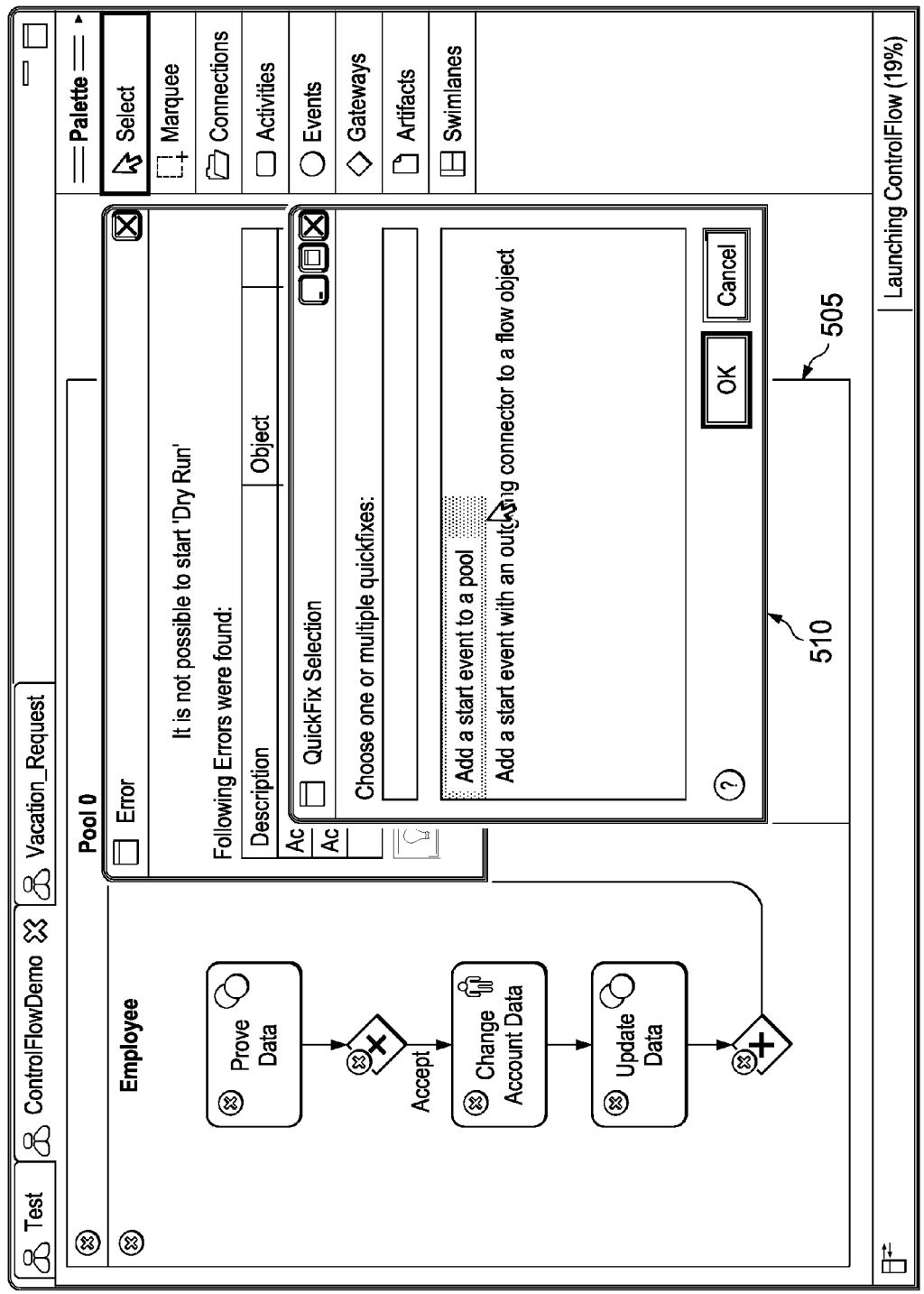
Figure 5D:
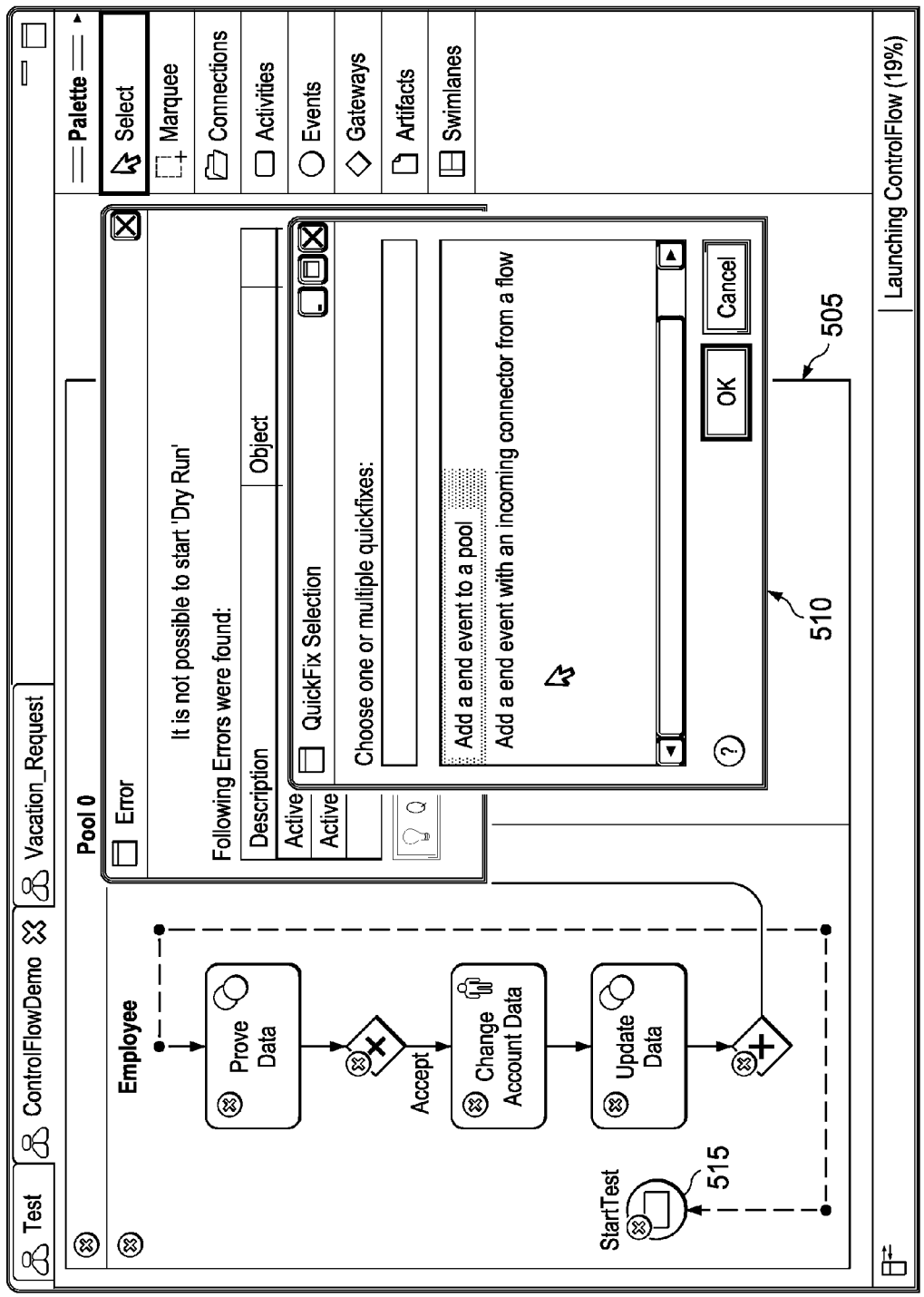
Figure 5E:
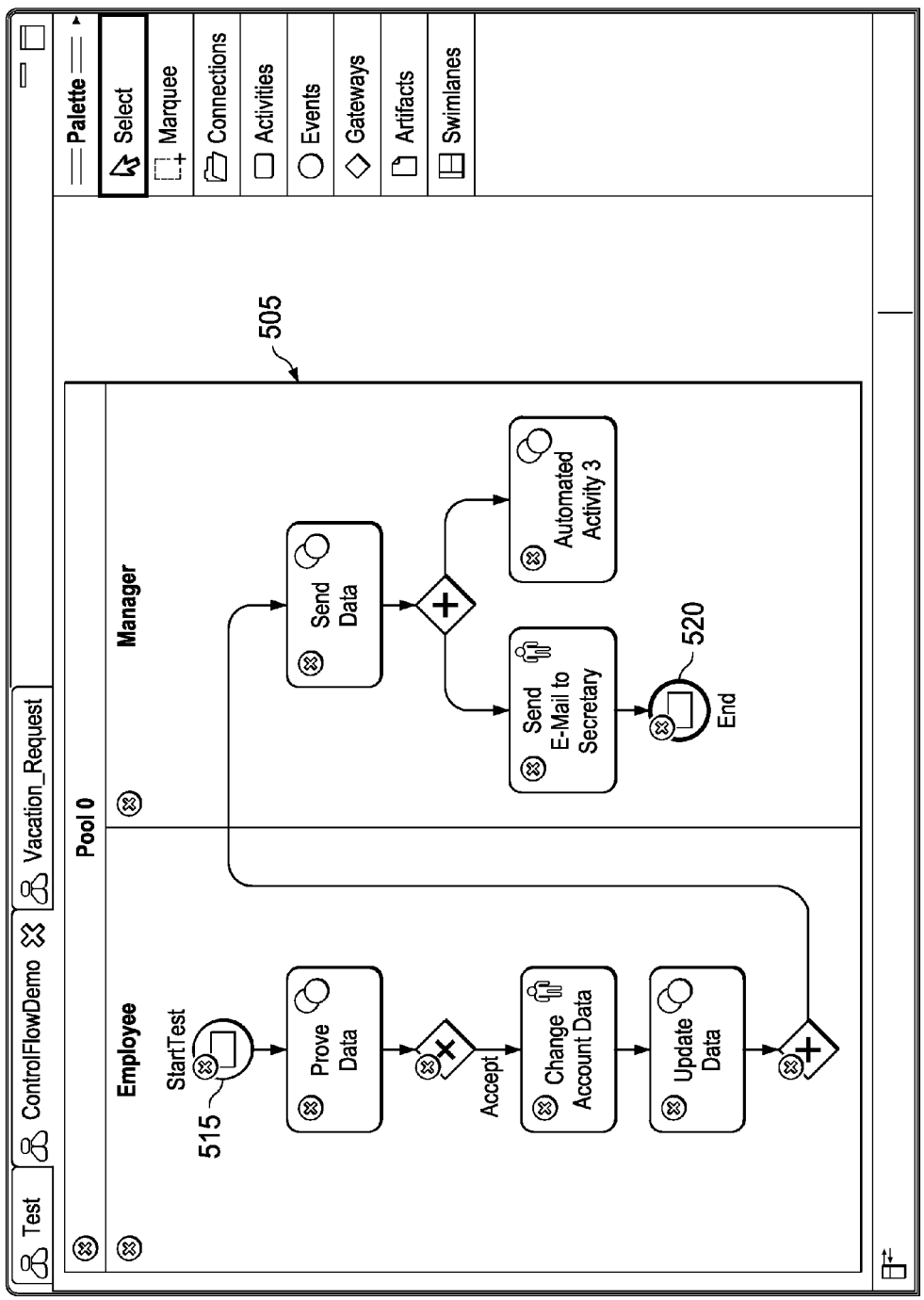

FIGS. 5A-5E illustrate example screenshots of a user interface 400 of a design-time environment including a dry-run simulation tool in a second example. In some instances, in order for a dry-run to begin, a start and end event need to be specified in order to define the bounds of the dry-run. Such is the case in the examples of FIGS. 5A-5E. As shown in FIG. 5A, a process model 505 has been selected for a dry-run debugging, using a dry run tool of an integrated development environment. The process model 505, in this particular example, relates to a modeled process for accepting, modifying, and managing user log-in data. However, as shown in FIG. 5B, as a user attempts to begin the dry-run, an error prompt 510 can be presented indicating to the user that neither a start event nor an end event had been specified for the dry-run. Rather than cancelling the dry-run, as with the identification of other errors during the dry-run, the dry-run simulation tool can allow the user to resolve the identified errors, through the prompt 510, to allow the dry-run simulation to proceed to completion. As shown in FIG. 5C, a user can specify a start event through the error prompt GUI 510. Additionally, the user can further specify an end event, as shown in FIG. 5D. Additionally, the user can enter, or modify, the start and/or end events within the graphical representation of the model itself, by dragging and dropping event icons 515, 520 to their proper places in the model path. As shown in FIG. 5E, the user has positioned start event 515 and end events 520 so as to define an acceptable path in the model for the dry-run (e.g., a path that includes an "end" event that follows a "start" event). Indeed, in some examples, dry-run resolution inputs, submitted by a user in connection with an error prompt, can include user interactions with and modifications to the graphical representation of the model, its events, and paths. For instance, a user can temporarily correct a control error by re-ordering events in the model on the graphical representation of the model, to resolve a dry-run error.

FIGS. 4A-4F and 5A-5E present two non-limiting examples of the use of a dry-run design-time tool to test, debug, and simulate business process models. Other examples can include alternate protocols for handling and presenting errors, accepting user resolution inputs, and other features. The dry-run simulation tool, as well as any other associated design-time tools, such as integrated development environment tools, can include additional or fewer features, and still be within the scope of some of the claims. It can also be appreciated that the types, complexity, and size of business process models simulated using a dry-run simulation tool can be potentially limitless in variety. In some instances, a dry-run simulation tool can be specific to a particular process model format or specification. For instance, certain process models can be directed to specialized processes developed to be compatible with a particular enterprise software environment. Accordingly, the dry-run simulation tool (as well as the greater design-time environment) can be adapted or even dedicated to be compatible with certain specialized process model formats.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:

1. A computer-implemented method for performing a dry-run of a business process model in a design-time environment, the method comprising:
   identifying, by a processor, a start event and at least one end event of the business process model defining at least one path of a flow map of the business process model, the path including a sequence of a plurality of events, the plurality of events including the start event, the at least one end event, and at least one other event, the at least one other event positioned between the start event and the end event in the sequence;
   stepping-through, by the processor, the plurality of events in the path to simulate each event in the plurality of events;
   identifying, by the processor, at least one error corresponding to a particular event in the path;
   pausing, by the processor, the stepping-through of the plurality of events at the particular event in response to identifying the at least one error;
   prompting, by the processor, a user for an input to at least temporarily resolve the at least one error;
   resuming, by the processor, stepping-through of the plurality of events in response to a resolution input from the user; and
   ending, by the processor, the dry run in response to stepping-through to the at least one end event.

2. The method of claim 1, further comprising a graphical representation of at least a portion of the business process model is presented to the user on a GUI and progress of the stepping-through of the plurality of events is presented on the GUI.

3. The method of claim 1, wherein prompting the user for an input includes presenting an interactive pop-up window adapted to receive inputs from the user.

4. The method of claim 1, wherein prompting the user for an input includes presenting a listing of input options to the users, wherein the listing of input options includes a plurality of inputs determined to be potential resolutions to the error.

5. The method of claim 1, wherein:
   the particular event includes a process using at least one variable;
   the error relates to a failure to provide a value for the at least one variable; and
   the resolution input includes a user-specified value for the at least one variable.

6. The method of claim 5, wherein the at least one variable corresponds to an input to be received through a user interface associated with a runtime business process modeled by the business process model.

7. The method of claim 5, wherein the at least one variable corresponds to an input to be received from another process in a runtime implementation of a business process modeled by the business process model.

8. The method of claim 5, wherein the at least one variable corresponds to an output of a runtime business process modeled by the business process model.

9. The method of claim 1, wherein:
   the particular event includes a decision based at least in part on at least one condition;
   the error relates to a failure to provide at least one condition for the decision; and
   the resolution input includes a user-specified condition.

10. The method of claim 1, wherein the business process model is an underspecified business process model.

11. The method of claim 10, wherein the business process model is non-compilable.

12. The method of claim 10, wherein the business process model is non-executable within a runtime environment based at least in part on the at least one error.

13. The method of claim 1, wherein the design-time environment is an integrated development environment.

14. The method of claim 1, further comprising:
   identifying that the business process model lacks at least one of a start event and an end event;
   pausing initiation of the stepping-through of the plurality of events in response to identifying that the business process model lacks at least one of a start event and an end event;
   prompting the user to specify the lacking at least one of a start event and an end event;
   initiating stepping-through of the plurality of events in response to a user specification of the lacking at least one of a start event and an end event.

15. The method of claim 1, further comprising modifying the business process model based at least in part on the resolution input.

16. A system comprising:
   a integrated development environment including a dry-run simulator, the dry-run simulator including:
      at least one memory device storing at least one business process model, the business process model including a data flow map that includes at least one path, the path including a sequence of a plurality of events, the plurality of events including a start event, an end event, and at least one other event, the at least one other event positioned between the start event and the end event in the sequence;
      a simulator tool adapted to step-through the plurality of events in the path to simulate each event in the plurality of events, identify at least one error corresponding to a particular event in the path, and pause stepping-through of the plurality of events at the particular event in response to identifying the at least one error; and
      an error resolution tool adapted to prompt a user for an input to at least temporarily resolve the at least one error and receive resolution inputs from the user, wherein paused step-through of the plurality of events resumes in response to a resolution input from the user.

17. The system of claim 16, wherein the integrated development environment further includes a source code editor, a compiler, a build automation tool, and a debugger.

18. The system of claim 16, wherein the integrated development environment is provided as a service to at least one remote client computing device.

19. The system of claim 16, wherein the integrated development environment further includes a graphical user interface adapted to present a graphical representation of at least a portion of the business process model to the user, present progress of the stepping-through of the plurality of events to the user, and present a prompt to the user identifying the error.

20. An article comprising a machine-readable storage device storing instructions operable to cause at least one processor to perform operations comprising:

performing a dry-run of a business process model in a design-time environment, wherein performing the dry-run of the business process model includes:

identifying a start event and at least one end event of the business process model defining at least one path of a flow map of the business process model, the path including a sequence of a plurality of events, the plurality of events including the start event, the at least one end event, and at least one other event, the at least one other event positioned between the start event and the end event in the sequence;

stepping-through the plurality of events in the path to simulate each event in the plurality of events;

identifying at least one error corresponding to a particular event in the path;

pausing the stepping-through of the plurality of events at the particular event in response to identifying the at least one error;

prompting a user for an input to at least temporarily resolve the at least one error;

resuming stepping-through of the plurality of events in response to a resolution input from the user; and ending the dry run in response to stepping-through to the at least one end event.

\* \* \* \* \*